United States Patent
Zahn (10) Patent No.: US 6,535,864 B1
(45) Date of Patent: Mar. 18, 2003

(54) METHOD FOR MAPPING ALTERATIONS IN SYSTEM STATE TO KNOWLEDGE BASE OBJECTS IN A PERSISTENT REPOSITORY-RESIDENT KNOWLEDGE BASE

(75) Inventor: Karl Theodore Zahn, Westminster, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/368,784

(22) Filed: Aug. 5, 1999

(51) Int. Cl.[7] .............................. G06F 17/00; G06N 5/02
(52) U.S. Cl. ................................ 706/47; 706/45; 706/8
(58) Field of Search .............................. 706/45, 47, 48, 706/46, 3, 4, 8, 14; 700/49

(56) References Cited

U.S. PATENT DOCUMENTS

| | | | | |
|---|---|---|---|---|
| 4,916,625 A | * | 4/1990 | Davidson et al. | 706/45 |
| 5,136,523 A | * | 8/1992 | Landers | 706/50 |
| 5,159,662 A | * | 10/1992 | Grady et al. | 706/48 |
| 5,230,061 A | * | 7/1993 | Welch | 706/46 |
| 5,276,776 A | * | 1/1994 | Grady et al. | 706/48 |
| 5,283,856 A | * | 2/1994 | Gross et al. | 706/47 |
| 5,644,770 A | * | 7/1997 | Burke et al. | 706/47 |
| 5,758,031 A | * | 5/1998 | De Silva | 706/47 |
| 5,761,389 A | * | 6/1998 | Maeda et al. | 706/47 |
| 5,802,253 A | * | 9/1998 | Gross et al. | 706/47 |
| 5,809,238 A | * | 9/1998 | Greenblatt et al. | 709/202 |
| 5,996,114 A | * | 11/1999 | Moeller | 714/699 |
| 6,151,697 A | * | 11/2000 | Moeller | 714/759 |
| 6,158,043 A | * | 12/2000 | Moeller | 714/699 |
| 6,321,217 B1 | * | 11/2001 | Maeda et al. | 706/47 |
| 6,356,885 B2 | * | 3/2002 | Ross et al. | 706/45 |

OTHER PUBLICATIONS

Lee et al., A Casual Knowledge–Driven Inference Engine for Expect System, Proceedings of the 31st Hawaii International Conference on System Sciences, Jan. 1998, vol. 5, pp. 284–293.*

(List continued on next page.)

*Primary Examiner*—John A. Follansbee
*Assistant Examiner*—Kelvin Booker
(74) *Attorney, Agent, or Firm*—Phuong-Quan Hoang; Mark T. Starr; Lise A. Rode (57) ABSTRACT

A method is provided in a computer system executing a repository program and having a storage means for mapping alterations in system state to rules, both of which are part of an object-oriented model resident in a persistent repository. The method includes storing in the persistent storage means the model comprising a set of rules and a set of facts defining event states, both of which are stored as objects. The set of rules and said set of facts comprise an object-oriented representation of the model. Next, a set of commands representing an extensible inference engine are loaded as meta objects into the persistent storage. The method accepts as inputs events representing alterations in the set of facts. All of the events are retained and the events are mapped to the set of rules for deriving a list of affected rules, which are evaluated to determine if they have been qualified. Only those affected rules determined as qualified are saved for further processing.

13 Claims, 9 Drawing Sheets

OTHER PUBLICATIONS

Vestli et al., Modeling Control in Rule–Based Systems, IEEE Software, Mar. 1994, vol. 11, Iss 2, pp. 77–81.*

Cockett et al., Prime Rule–Based Methologies Give Inadequate Control, Proceedings of the ACM SIGART International Symposium on Methologies for Intelligent Systems, 1986, pp. 441–449.*

Whitson et al., Using an Artificial Neural Network System to Determine The Knowledge Base of an Expert System, Proceedings of the 1990 ACM SIGSMALL, 1990, pp. 268–270.*

Gupta et al., High–Speed Implementations of Rule–Based Systems, ACM Transactions on Computer Systems, May 1989, Vo 7, No. 2, pp. 119–146.*

Harandi et al., Rule Based Management Using Meta Knowledge, Proceedings of the 1986 ACM SIGMOD International Conference on Management of Data, 1986, pp. 261–267.*

* cited by examiner

METHOD FOR MAPPING ALTERATIONS IN SYSTEM STATE TO KNOWLEDGE BASE OBJECTS IN A PERSISTENT REPOSITORY-RESIDENT KNOWLEDGE BASE

CROSS REFERENCE TO RELATED APPLICATIONS

This patent document relates to the following patent applications, assigned to the same assignee hereof, which are incorporated herein by reference.

U.S. patent application Ser. No. 09/368,785, entitled A METHOD AND SYSTEM FOR PROCESSING RULES USING AN EXTENSIBLE OBJECT-ORIENTED MODEL RESIDENT WITHIN A REPOSITORY.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to a method for detecting changes to a system state in a domain represented by a rules-based knowledge base.

BACKGROUND OF THE INVENTION

A knowledge-based system uses knowledge to solve problems. It is capable of distinguishing between knowledge itself and a knowledge interpreter, which is called an Inference Engine.

Knowledge itself can be represented by two distinct sets of information. The first is a set of domain-specific data about the problem and the environment, the confidence measures and the "dead ends" in the environment. The second set of information is a set of rules that express the conditions necessary to regulate the individual pieces of data in the first set, wherein the individual pieces of data represent facts about a steady state representation of the domain.

The Inference Engine is responsible for the execution process. The Inference Engine may employ some of the following principles:

Conflict resolution strategy that specifies which rule to fire first. Among commonly used strategies are the last recently used rule strategy or the most recently used rule strategy, etc.

Efficient pattern matching like the Markov Algorithm, that controls the search using a predefined order of rules to fire or the Rete Algorithm that speeds up the Markov Algorithm by looking only for changes in matches rather than for every rule every time.

Execution of the Right-Hand-Side of rules, which facilitates certain kind of prediction of the possible behavior.

Prior art in the area of this invention includes knowledge being represented by a rooted acyclic directed graph, the Rete; where the nodes, with the exception of the root, depict patterns. A pattern is a unique combination of rules that lead up to a node from the root node in the acyclic directed graph. Paths from the root to the nodes, represent the left-hand side of the rules that make up the patterns. Information is stored at each node about the facts satisfied by the patterns of the nodes in the paths from the root up to and including the current node. This information is a relation representing the possible values of the variables occurring in the patterns in the path. Such a form of knowledge representation suffers from the enormous memory requirements for storing successively larger nodes since information stored at each node in the Rete network is the cumulative information stored at all the nodes before it in the path leading up to that node from the root node.

The Rete Algorithm, adopted by most knowledge processing systems, keeps up to date the information associated with the nodes in the graph. When a fact is added or removed from the corking memory, a token representing the fact and operation is entered at the root of the graph and propagated to its leaves, modifying as appropriate, the information associated with the nodes. This requires considerable processor time and memory resources devoted to propagating the change through all the nodes in the network before the rules affected by the change are identified and queued up for firing.

A need was felt to use a model-based approach that would allow the user to define relationships between rules and data. Thus, any update to the entire knowledge base could be made by applying that update to the root objects in the knowledge base and this update would result in all objects related to the root object being updated and so on. It was felt that a model-based approach to representation of domains would make the task of manipulating data and rules very simple.

SUMMARY OF THE INVENTION

An object of the present invention is to provide an object-oriented method of mapping alterations in system state objects to knowledge-base objects called rules, both of which are part of an object-oriented model of the domain resident in a persistent repository.

Another object of the present invention is to provide an object oriented method of evaluating only those rules that have been affected by a state change.

Still another object of the present invention is to provide an object oriented method of allowing an AgendaQueue object to retain, for further processing, only those affected rules whose all rule conditions have been satisfied.

These and other objects, features and advantages, which will become apparent as the invention is described in detail below, are provided in a computer system executing a repository program and having a storage means, a method for mapping alterations in system state to rules, both of which are part of an object-oriented model resident in a persistent repository. The method includes storing in the persistent storage means the model comprising a set of rules and a set of facts defining event states, both of which are stored as objects. The set of rules and said set of facts comprise an object-oriented representation of the model. Next, a set of commands representing an extensible inference engine are loaded as mete objects into the persistent storage. The method accepts as inputs events representing alterations in the set of facts. All of the events are retained and the events are mapped to the set of rules for deriving a list of affected rules, which are evaluated to determine if they have been qualified. Only those affected rules determined as qualified are saved for further processing.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
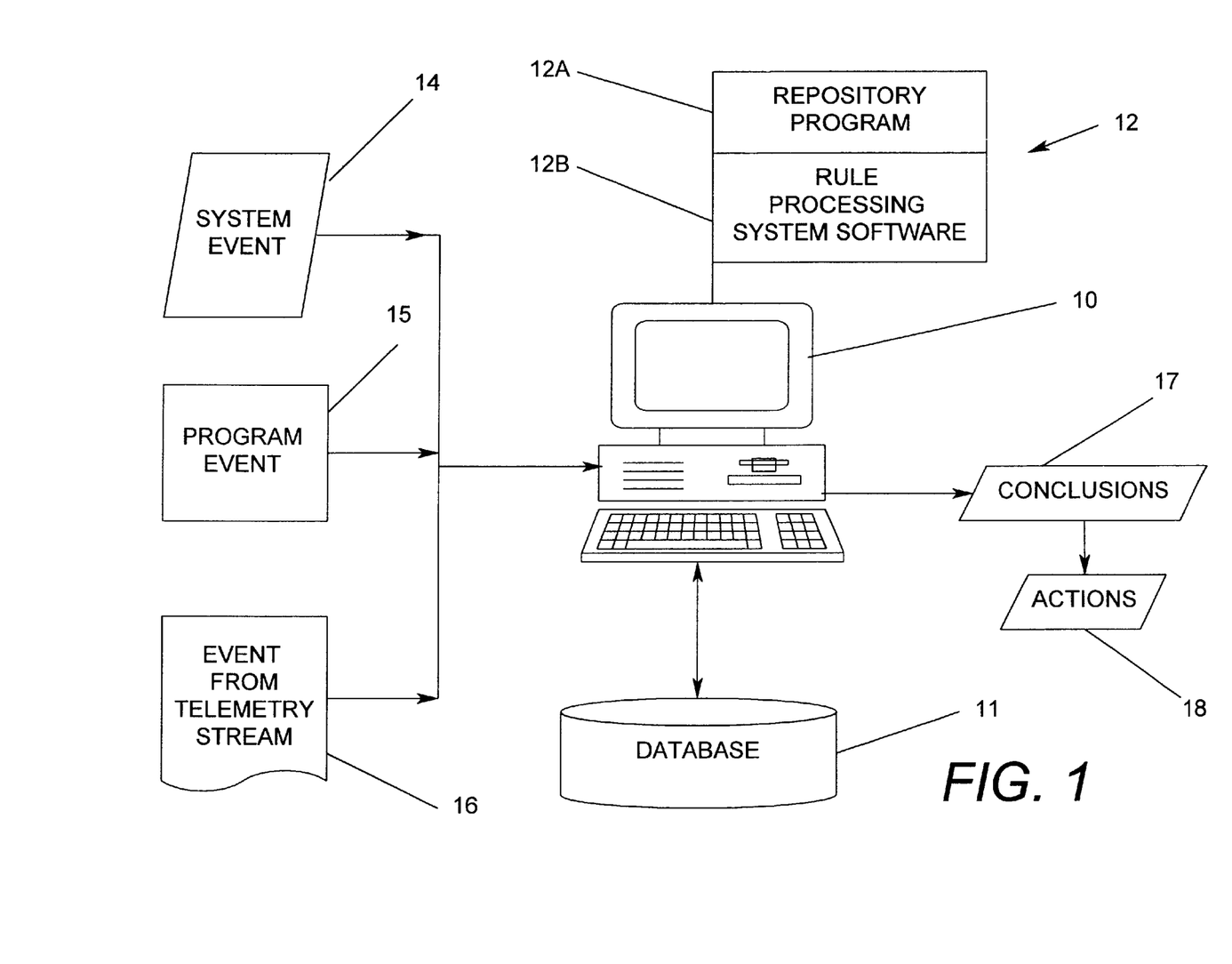
FIG. 1 is a block diagram of a system that may employ the system and method of the present invention.

Referring now to the drawings and FIG. 1 in particular, a block diagram of a system that may execute the method of the present invention is shown. A computer 10 is coupled to a database 11, and the computer 10 is capable of executing a variety of software programs 12, such as a repository program 12A and a rule processing system software 12B. In accordance with the system and method of the present invention, which will be amplified further hereinafter, the computer 10 accepts as inputs a system event 14, or a program event 15 or an event from a telemetry stream 16. By use of the rule processing system software 12B (which operates in conjunction with the repository program 12A), the computer 10 responds with conclusions 17 that lead to actions 18.

The repository 12A further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U. S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073 for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if sat forth in full herein.

Figure 2:
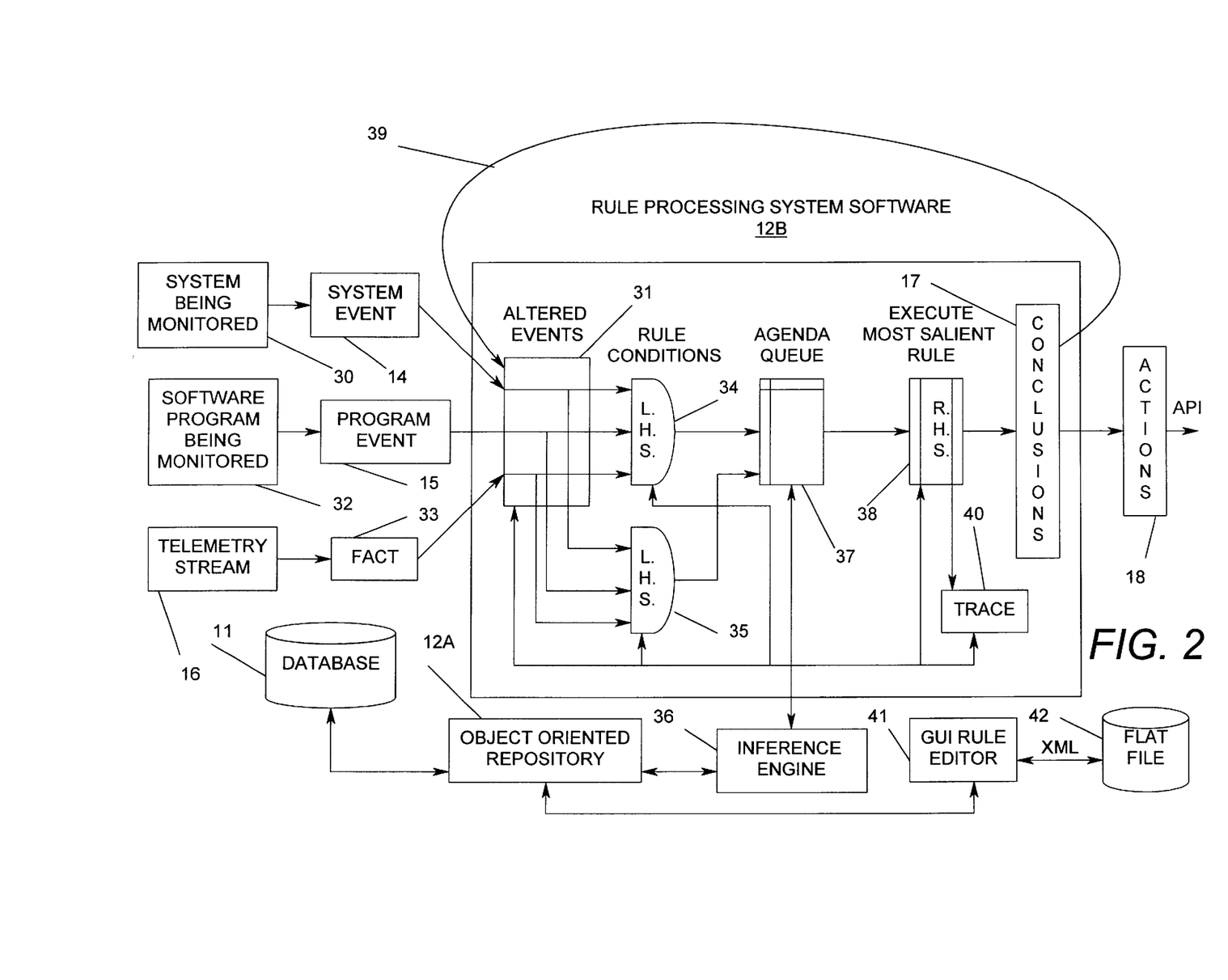
FIG. 2 is a module block diagram of the system and method of the present invention.

Referring now to FIG. 2, a block diagram illustrates the rule processing system software 12B in greater detail. A system 30 being monitored generates a System Event 14, which is detected by an Altered Events module 31. Similarly, a software program 32 being monitored generates a Program Event 15, which is also detected by the Altered Events module 31. Moreover, a fact 33 from the Telemetry Stream 16 being monitored is detectable by the Altered Events module 31. The Altered Events module 31 retains a list of events that have changed state. The list of changed events in the Altered Events module 31 is applied to a set of rules 34 and 35, associated with the changed events. The AND gate depicts that for a rule to be satisfied all its rule conditions must be met simultaneously. This testing of rule conditions against changed events is gated by the output from an Inference Engine 36 operating in conjunction with the Repository 12A.

Rules that have been satisfied are passed on as inputs to an Agenda Queue 37, which is also gated by the Inference Engine 36. The Agenda Queue 37, determines the rule with the highest saliency among all the rules in the agenda queue. The most salient rule in the Agenda Queue is provided as an input to an Execute Most Salient Rule module 38. The Inference Engine 36 also gates the module 38. Execution of the Right Hand Side of the most salient rule, by module 38, infers a set of conclusions shown here as the Conclusions module 17. The Conclusion module invokes a set of Actions shown here as the Actions module 18 having an API output. The Actions module represents some action being performed on the System 30, the Software Program 32 or the Telemetry Stream 16. Also, a feedback loop 39 from the Conclusions module 17 is provided as an input to the Altered Events module 31. This signifies that an action may result in an event change which may qualify other rule conditions resulting in processing other rules in a similar manner to that described above.

A Trace Tool module 40 is responsible for keeping a log of all the rules that have been executed. In a situation where an unexpected action occurs, this tracing facility enables the user to trace back the sequence of rule executions that led to that action. Setting its attributes from the API controls this tracing module. A GUI Rule Editor 41 is disposed for use by a user who may want to control the running of the Inference Engine or set up the rules, events, conditions, conclusions representing the knowledge base, in the repository. The Flat File 42 stores a model-based representation of the set of rules and Facts that make up the knowledge base. Instead of setting up the knowledge base from the GUI Editor, the user has the option of setting up the knowledge base by importing it as an XML Stream from the flat file into the Repository.

Figure 3:
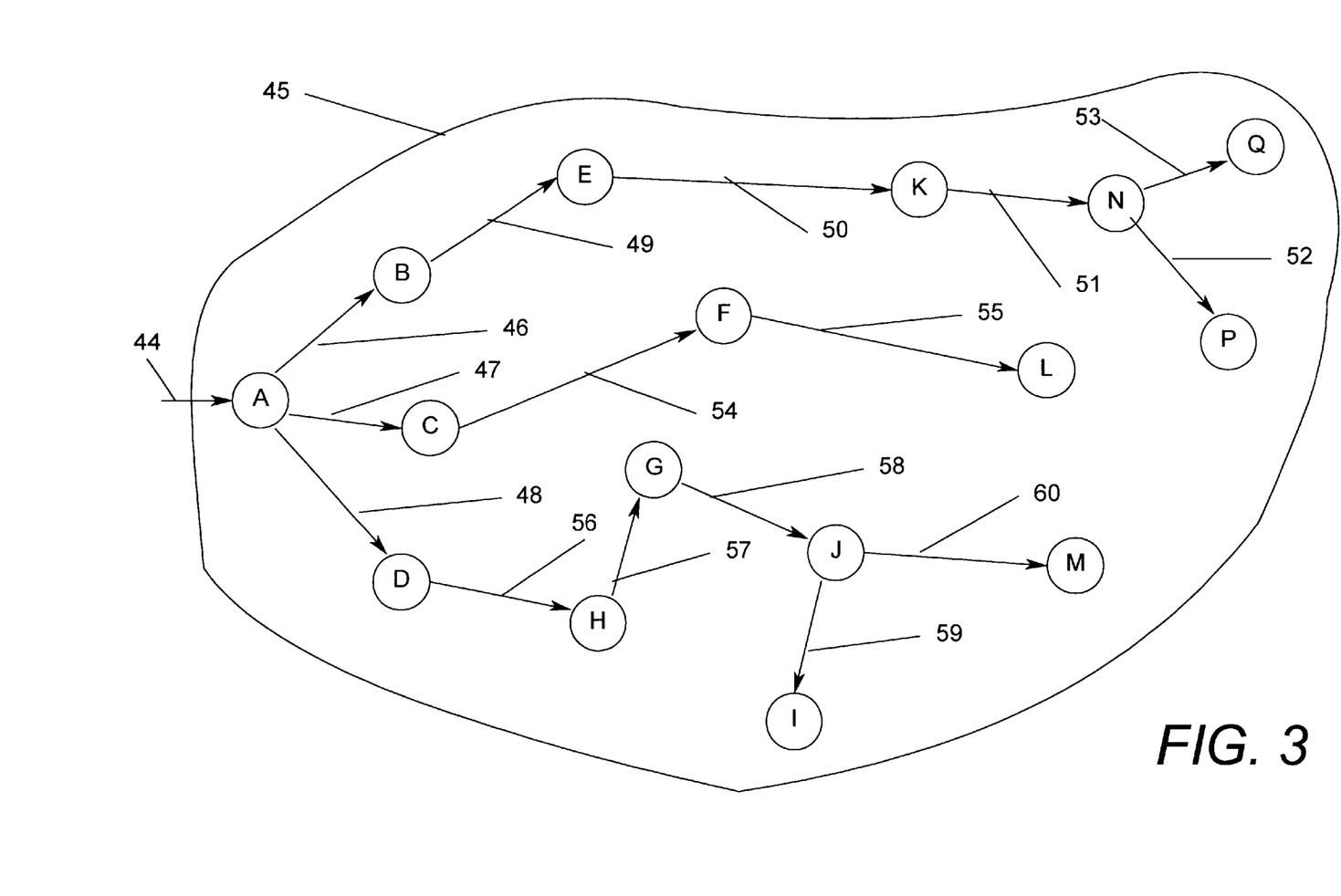
FIG. 3 is a conceptual diagram illustrating the parallel operation of the system and method of the present invention.

Referring now to FIG. 3, a node relationship diagram illustrates the concept of parallel analysis within a given domain space 45, wherein the event change 44 triggers execution of Rule A. The actions invoked by the Right Sand Side of Rule A results in events 46, 47 and 48, leading to Execution of Rules B, C and D, respectively. Rule B invokes event 46, which leads to execution of Rule E; and Rule E invokes event 50 leading to execution of Rule K. Rule K invokes event 51 leading to execution of Rule N, which in turn invokes events, 52 and 53, leading to execution of Rules P and Q. At the same time, or in parallel, Rule C invokes event 54 leading to execution of Rule F, which invokes event 55 thereby leading to execution of Rule L. Likewise at the same time, Rule D invokes event 56, which leads to execution of Rule H. Rule H invokes event 57, which leads to execution of Rule G, which invokes event 58 leading to execution of Rule J. Rule J invokes events, 59 and 60, which lead to execution of Rules I and M respectively.

Figure 4:
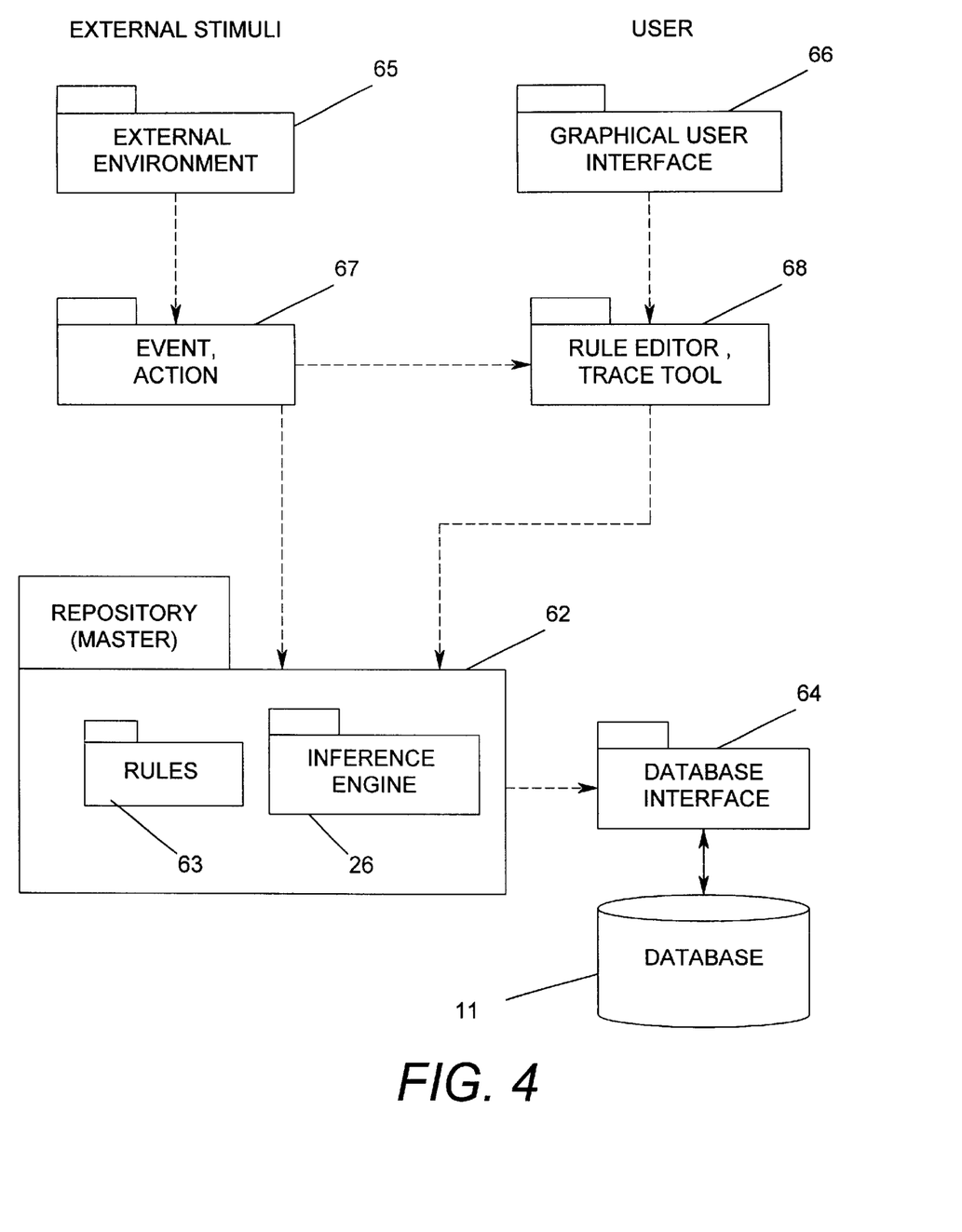
FIG. 4 is an UML-type package diagram illustrating the system and method of the present invention.

Referring now to FIG. 4, an UML-type package diagram illustrating the functional components of the system and method of the present invention is shown. The Master Package 62 incorporates a repository resident, persistent set of Rules 63 and the extensible Inference Engine 26. This forms the core of the invention presented here, in that it is a Persistent repository-resident, Extensible, Model-based representation of a knowledge-base and an Inference Engine that can be extended or modified by an open GUI to meet any specific needs of a user. A database interface 64 couples the database 11 to the repository incorporated in master package 62. Classes contained in packages 65 and 67 together represent the interface of the Master package with the domain whose knowledge base is represented by the persistent set of rules in the repository. Similarly, classes contained in packages 66 and 68 together represent the interface of the Master Package with the user who can either set up the persistent set of rules in the repository or control the Extensible Inference Engine through a GUI. Package 68 also allows the user to trace the sequence of actions taken by the Rule Processing System(RPS) since the Tracing Tool maintains a log of all the actions taken by the RPS.

Figure 5:
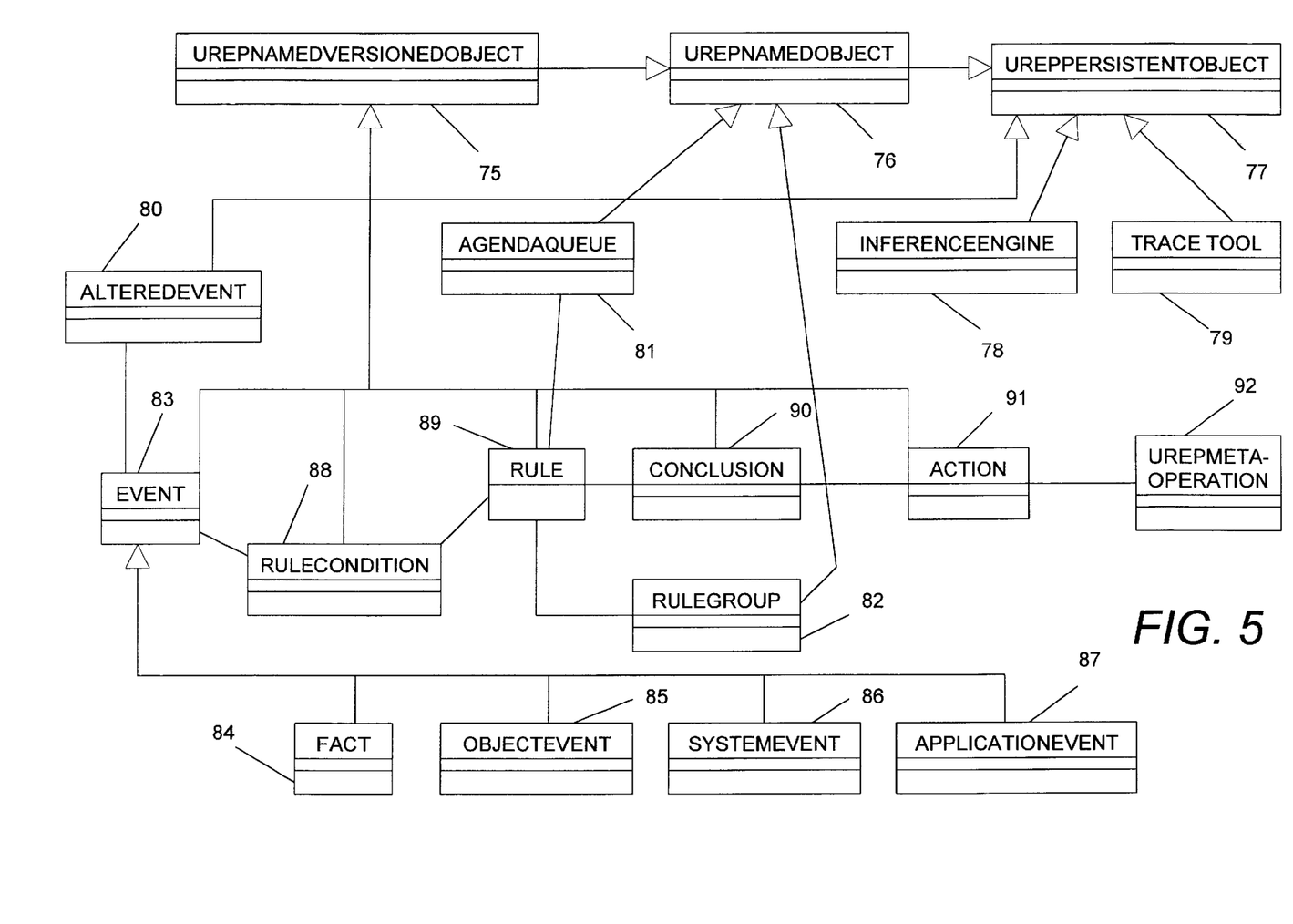
FIG. 5 is an UML-type class diagram illustrating the system and method of the present invention.

Referring now to FIG. 6, an UML-type class diagram illustrates the functional components of the system and method of the present invention. Within the Repository 12A, a NamedVersioned Object 75, a Named Object 76 and a Persistent Object 77 are created. The Persistent Object 77 is a super-class from which are derived an Inference Engine class 78, a Trace Tool class 79 and an Altered Event class 80. The extensible class 78 represents the Inference Engine 36 (FIG. 2). Its operations include RUN, HALT, SINGLESTEP, RESET, CYCLE, CLEAR, RUN, CONTINUOUS, and FINDSTARTUPRULES. All these operations are extensible in that the user can extend these operations to create operations specific to his needs. They are persistent in that they remain stored in the repository and their state is preserved even if the system is shut down. The class 79 has the operation TRACE that maintains a log of all the actions taken by the RPS. The class 80 instantiates an Altered Events object that retains all the event changes as shown in module 31 (FIG. 2). The NamedVersion class 76 is a super-class that derives an AgendaQueue class 81 and a RuleGroup class 82. An Instance of the AgendaQueue Class 81 is a list of rules that are queued for execution. Rules are placed on the AgendaQueue when their rule-conditions are met. This class has the operations CLEAR, SYNC, and SELECTRULE and is shown by the Agenda Queue module 31 (FIG. 2). An instance of the RuleGroup class 82 can be viewed as a container of a set of rules referring to similar event changes. The user is allowed to add or remove rules from the set of rules contained in that instance. This class also allows the user to enable or disable the entire set of rules contained in an instance of that class. This gives the user the option to enable or disable distinct sets of rules that depends on the event changes he wants to monitor. An object of the Rule-Group Class has the Operations addRULE,removeRULE, ENABLE, DISABLE, STATUS, Construct.

The Persistent Object 77 derives the Altered Event class 80. A single instance of this class retains the events that have changed state. Thus an instance of the AlteredEvents class is associated with one or more instances of the Event class 83 that have been altered. The Event Class 83 is itself a super-class of a Fact class 84, an Object Event class 85, a System Event class 86 and an Application Event class 87. Respective Objects of these subclasses of the Event class are instantiated when an input to the RPS, from either a System or an Application or a Telemetry Stream, changes state.

Each instance of the Event class 83 qualifies one or more associated instances of the RuleCondition class 88. This means that a change of state, inputted from either a system or application or a telemetry stream, can qualify as satisfied or unsatisfied one or more associated rule conditions. An operation of the RuleCondition class is TEST and an attribute is SATISFIED.

One or more instances of the RuleCondition class 88 also qualify an instance of the Rule class 89. Thus Rule Conditions represent the constraints that must be satisfied for the rule to be satisfied and ultimately placed on the Agenda-Queue. A rule is the control of the system. Rules consist of a Left Hand Side (L.H.S.) which are the rule conditions and a Right Hand Side (R.H.S.) which are the conclusions. Whenever the conditions of the rule are met, a set of conclusions is dram. As an example: whenever you see the red light, you should stop. Thus each instance of the Rule Class 89 infers one or more instances of the Conclusion class 90. Also, a rule belongs to one or more RuleGroups. Thus each instance of the Rule Class 89 belongs to one or more instances of the RuleGroup Class 82. Rules that have been satisfied are placed on the AgendaQueue. Thus, a satisfied instance of the Rule Class 89 is retained by the agenda of an instance of the AgendaQueue class 81. The Rule Class has attributes ENABLED, SATISFIED, and SALIENCE and has operations FIRE, DISABLE, RESET, INSTANTIATE, UNINSTANTIATE, EVALUATE. The salience attribute allows the user to specify the importance of a rule at the time of modeling the rule-based knowledge system. This attribute can take on five values: Most salient, Salient, Normal, Lass Salient, Least Salient. The relative Saliency, of instances of the Rule Class placed on the AgendaQueue, is used to determine the rule that should be executed first. This step is illustrated in greater detail in FIG. 10 of Patent App 1084. When an instance of the Rule Class 89, selected for execution as described in FIG. 10 of Patent App 1084, is fired, it instantiates one or more instances of the Conclusion Class 90. Each instance of the Conclusion Class 90 invokes an instance of the Action Class 91; and the instance of the Action Class 91 executes one or more instances of the Meta Operation Class 92. The Event class 83, the Rule Condition class 88, the Rule class 89 and a Conclusion class 90, an Action class 91 and a Meta Operation class 92 are all sub-classes of and included in the NamedVersion Object class 75.

Figure 6A:
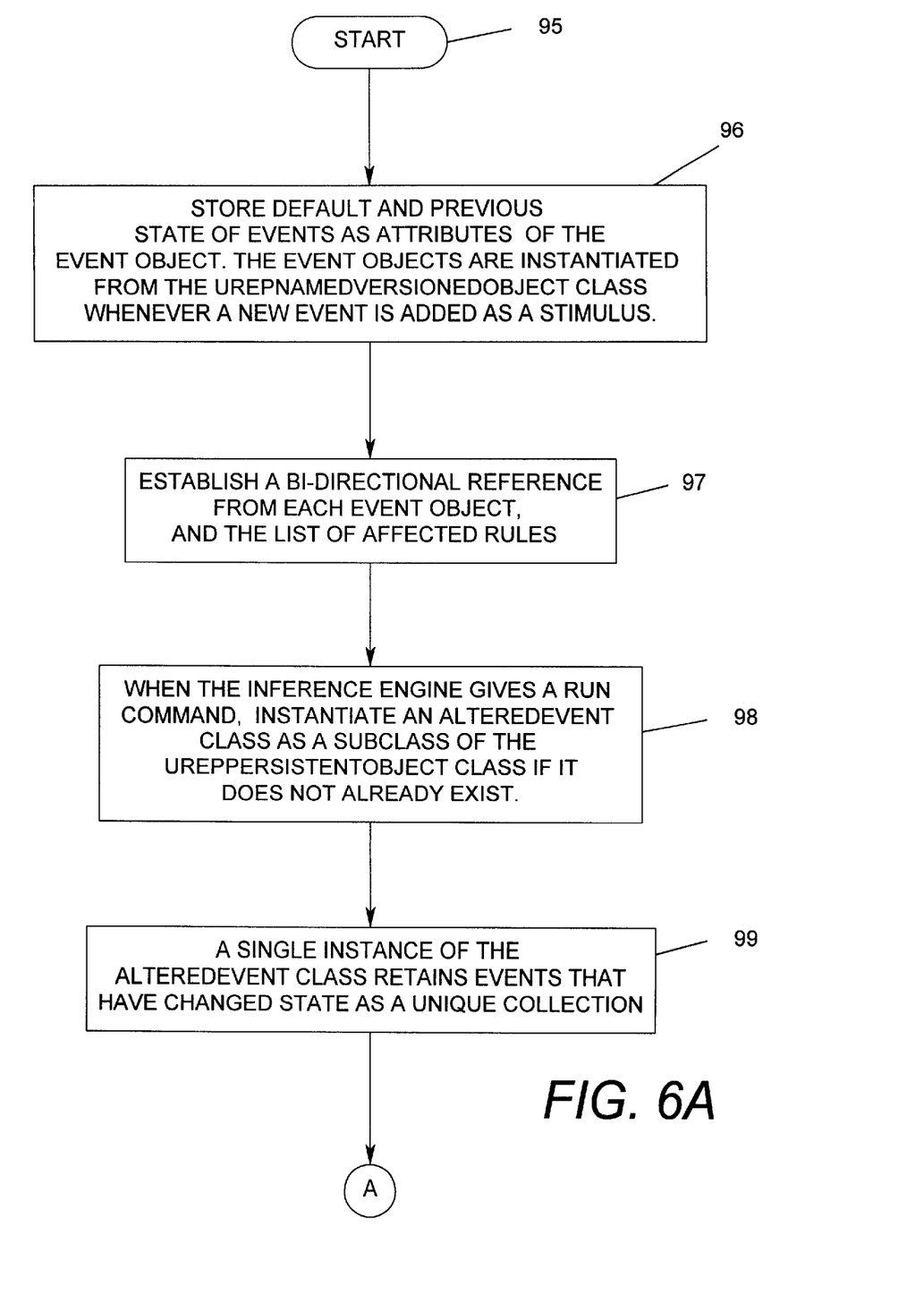
FIGS. 6A, 6B, 6C, and 6D combined form a flow chart illustration of the method of the present invention.
Figure 6B:
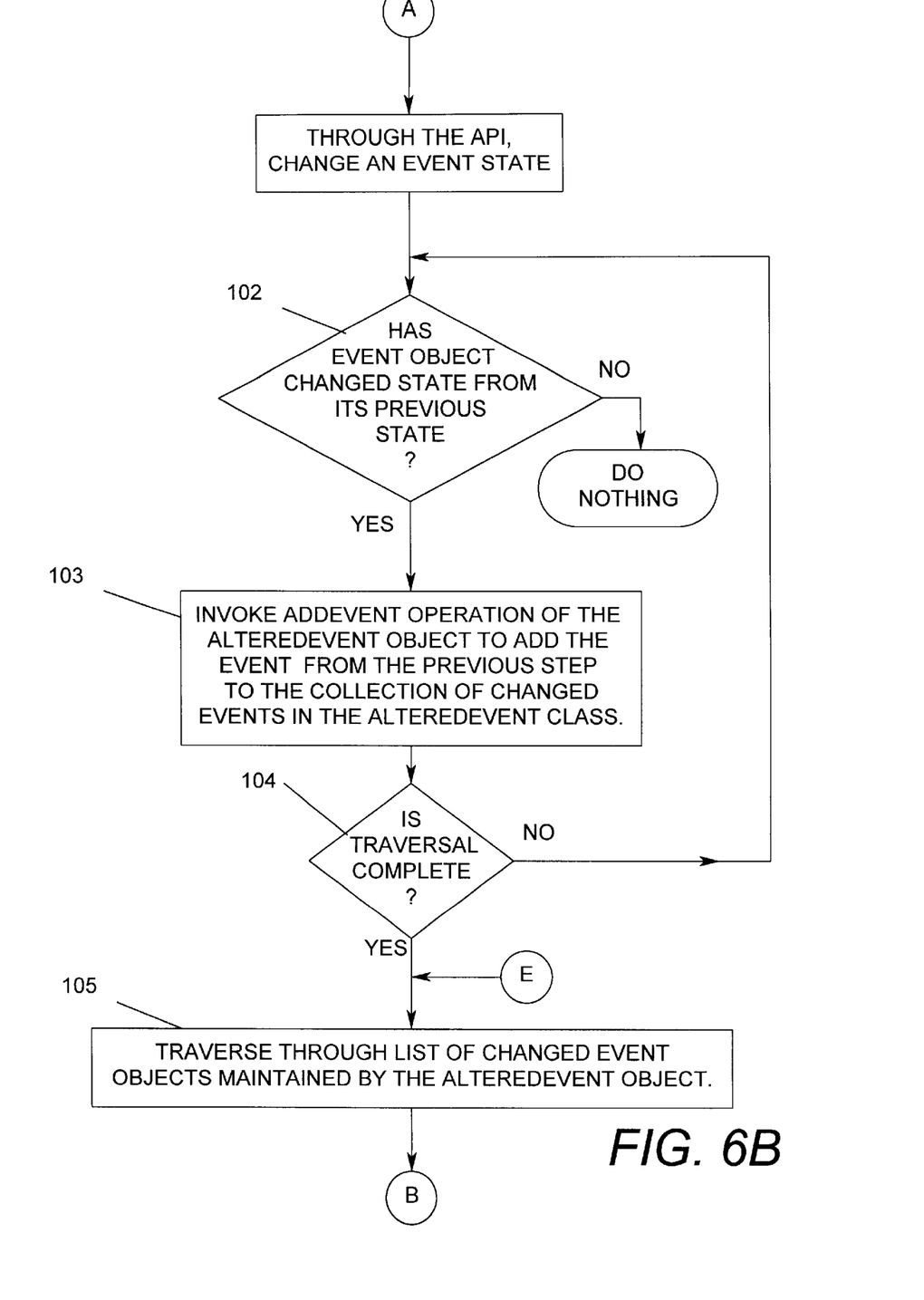

Referring now to FIG. 6A, the first of a four-sheet flow-chart illustration of the method of the present invention is shown. The process begins with a start bubble 95 followed by a atop of staring the default and the previous state of events as attributes of the Event Object (block 96). The Event Objects are instantiated from the Named Version Object class 76 (FIG. 5) whenever a new event is added as a stimulus. Next, a bi-directional reference is established from each Event Object and the list of affected Rules (block 97). After this, when the Inference Engine 26 gives a Run command, an Altered Event class 80 is instantiated as a sub-class of the Persistent Object class 77, if it does not already exist (block 98). A single instance of the Altered Event class 80 retains events that have changed state as a unique collection (block 99). The process continues in FIG. 68 as denoted by a connector A.

Referring now to FIG. 6B at the connector A, an Event is changed through the API (block 101) followed by an inquiry as to whether or not the Event Object has changed state from a previous state (diamond 102). If the answer to this inquiry is no, then nothing is done (bubble 100). On the other hand, if the Event Object has been changed, then and Add Event operation of the Altered Event Object is invoked in order to add the event from the previous step to the collection of changed events in the Altered Event class 80 (block 103).

After completion of the above, another inquiry is made as to whether or not the traversal is complete (diamond 104). If the answer to this inquiry is no, then a return is made back to the diamond 102. On the other hand, if the answer to this inquiry is yes, then a traversal is made through the list of changed Event Objects maintained by the Altered Event Object (block 105). The process continues in FIG. 6C as denoted by a connector B.

Figure 6C:
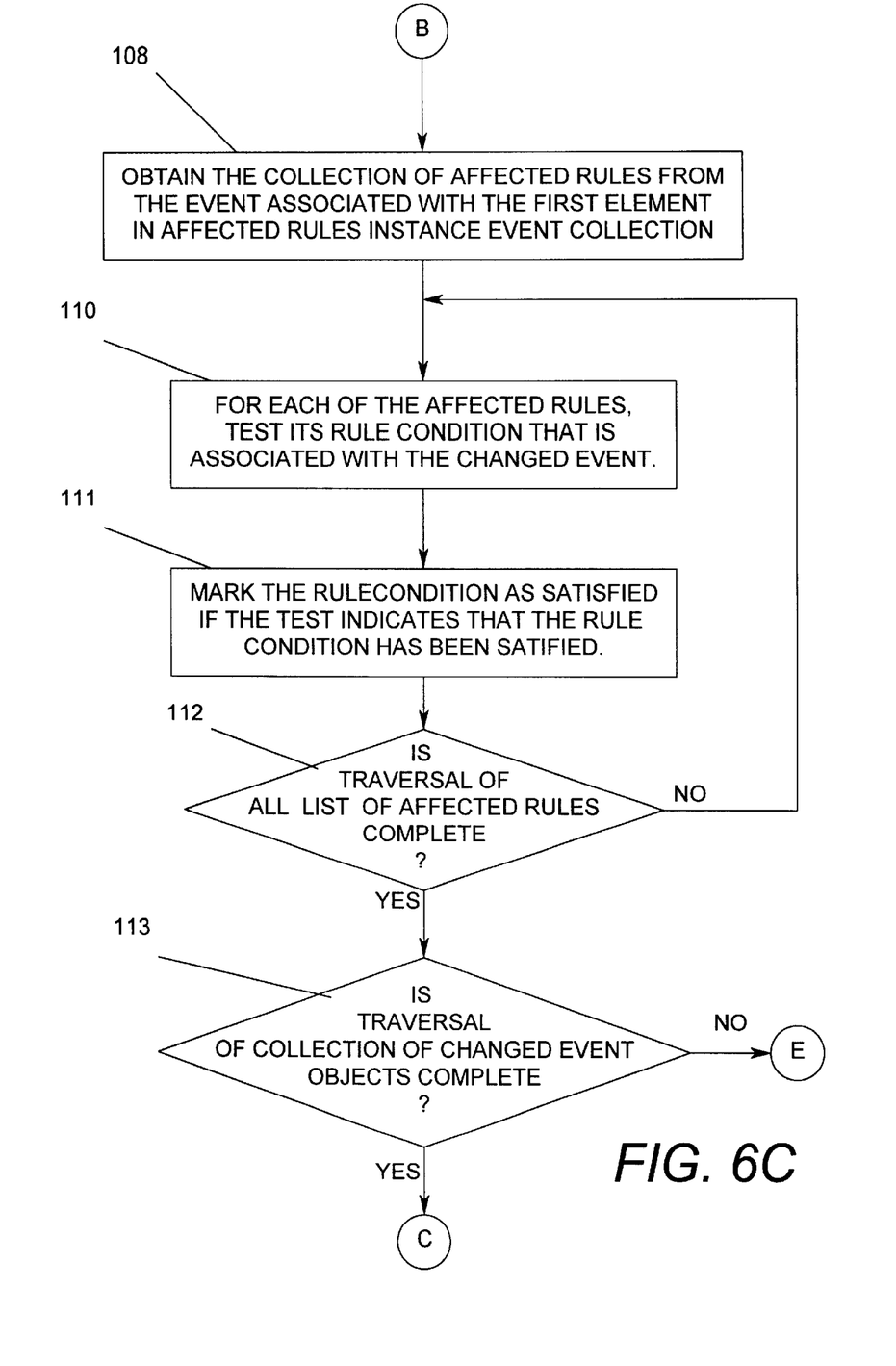

Referring now to FIG. 6C at the connector B, the collection of the affected Rules is obtained from the. Event associated with the first element in the Affected Rules instance Event collection (block 108). Next, for each of the affected Rules a test is made of its Rule Condition that is associated with the changed event (block 110). Next, if the test in the preceding step indicates that the Rule Condition has been satisfied, it is marked as satisfied (block 111). After this, an inquiry is made as to whether or not the traversal of all of the affected Rules is complete (diamond 112). If the answer to this inquiry is no, then a return is made back to the block 109. On the other hand, if the answer is yes, then another inquiry is made as to whether or not the traversal of the collection of changed Event Objects is complete (diamond 113). If the answer to this inquiry is no, then a return is made back to the block 105 in FIG. 6B through connector E. On the other hand, if the answer is yes, then a continuation of the process is shown in FIG. 6D at a connector C.

Figure 6D:
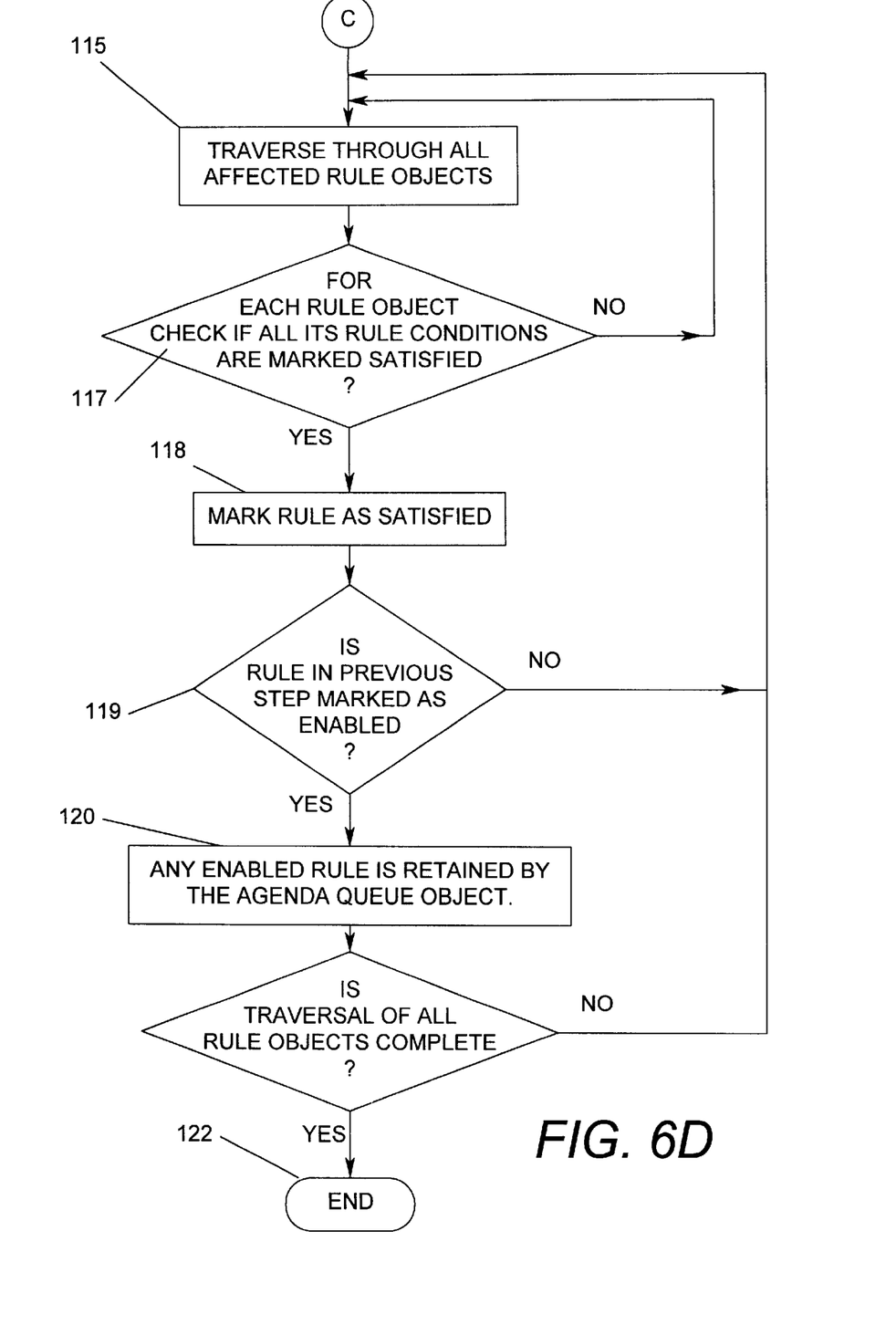

Referring now to FIG. 6D the connector C, a traversal is made through all of affected Rule Objects (block 115). Next, an inquiry is made for each rule object as to whether or sot all of its Rule Conditions are marked satisfied (diamond 117). If the answer to this inquiry is no, then a return is made back to the block 115). On the other hand, if the answer is yes, then this Rule is marked as satisfied (block 118). Next, an enquiry is made as to whether or not the rule that was marked as satisfied in the previous step is enabled (diamond 119). If the answer to this inquiry is no, then a return is made back to the block 115. On the other hand if the answer is yes then the Rule is retained by the Agenda Queue Object (block 120). Then an inquiry is made as to whether or not traversal of all rule objects is complete. (Diamond 121). If the answer to this inquiry is no then a return is made back to the block 115. On the other hand if the answer is yes, then the process ends (bubble 122).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program and having a storage means, a method for mapping alterations in system state to rules, both of which are part of an object-oriented model of the domain resident in a persistent repository, said method comprising:

a. storing in said persistent storage means said model comprising a set of rules sad a set of facts defining event states, both of which are stored as objects, wherein said set of rules and said set of facts comprise an object-oriented representation of said model;

b. loading as meta objects fn said persistent storage a set of commands representing an extensible inference engine;

c. accepting as inputs to said method events representing alterations in said set of facts;

d. retaining all of said events wherein said step of retaining comprises instantiating an AlteredEvent Class, which retains all of said events; and wherein said step of retaining further comprises determining if an accepted input represents an event, and if so;

adding an event object to a list of changed event objects retained by said instantiation of said AlteredEvent Class;

e. mapping said events to said set of rules for deriving a list of affected rules;

f. evaluating said list of affected rules to determine if they have been qualified, and if so;

g. saving for further processing only those affected rules determined as qualified in the preceding step, said saving comprising instantiating an AgendaQueue Class to retain only those affected rules determined as qualified.

2. The method as in claim 1 wherein said step of mapping comprises traversing said list of changed event objects to obtain a list of affected rules for each of said changed event objects.

3. The method as in claim 2 further comprises for each affected rule in said list of affected rules, testing s rule condition object belonging to said affected rule and associated with said changed event object to determine if said rule condition object is satisfied by said changed event, and if so marking said rule condition object as satisfied.

4. The method as in claim 3 further comprises traversing all affected rules to determine if all rule condition objects belonging to each of said affected rules is marked as satisfied.

5. The method as in claim 4 wherein if all rule condition objects belonging to each of said affected rules is marked as satisfied, then marking each of such affected rules as satisfied.

6. The method as in claim 5 wherein said step of saving further comprises retaining in an instance of an AgendaQueue Class each one of said affected rules marked as satisfied.

7. A storage medium encoded with machine-readable computer program code for use in a computer system executing a repository program and having a storage means, said computer program being a method for mapping alterations in system state rules, both of which are part of an object-oriented model of the domain resident in a persistent repository, wherein, when the computer program code is executed by a computer, the computer performs the steps of:

a. storing in said persistent storage means said model comprising a set of rules and a set of facts defining event states, both of which are stored as objects, wherein said set of rules and said set of facts comprise an object-oriented representation of said model;

b. loading as meta objects in said persistent storage a set of commands representing an extensible inference engine;

c. accepting as inputs to said method events representing alterations in said set of facts;

d. retaining all of said events; and wherein said step of further comprises determining if an accepted input represents an event, and if so;

adding an event object to a list of changed event objects retained by said instantiation of said AlteredEvent Class;

e. mapping said events to said set of rues for deriving a list of affected rules;

f. evaluating said list of affected rules to determine if they have been qualified, and if so;

g. saving for further processing only those affected rules determined as qualified in the preceding step, said saving comprising instantiating an AgendaQueue Class to retain only those affected rules determined as qualified.

8. A storage medium as in claim 7 wherein said step of mapping comprises traversing said list of changed event objects to obtain a list of affected rules for each of said changed event objects.

9. A storage medium as in claim 8 further comprises for each affected rule in said list of affected rules, testing a rule condition object belonging to said affected rule and associated with said changed event object to determine if said rule condition object is satisfied by said changed event, and if so marking said rule condition object as satisfied.

10. A storage medium as in claim 9 further comprises traversing all affected rules to determine if all rule condition objects belonging to each of said affected rules is marked as satisfied.

11. A storage medium as in claim 10 wherein if all rule condition objects belonging to each of said affected rules is marked as satisfied, then marking each of such affected rules as satisfied.

12. A storage medium as in claim 11 The method as in claim 8 wherein said step of saving further comprises retaining in an instance of an AgendaQueue Class each one of said affected rules marked as satisfied.

13. In a computer system executing a repository program and having a storage means, a method for mapping alterations in system state to rules, both of which are part of an object-oriented model of the domain resident in a persistent repository, said method comprising:

a. storing in said persistent storage means said model comprising a set of rules and a set of facts defining event states, both of which are stored as objects, wherein said set of rules and said set of facts comprise an object-oriented representation of said model;

b. grouping said set of rules as instances of a RuleGroup Class;

c. allowing a user to enable said instances of said RuleGroup Class instantiated in the preceding step;

d. loading as mete objects in said persistent storage a set of commands representing an extensible inference engine;

e. accepting as inputs to said method events representing alterations in said set of facts;

f. retaining all of said events;

g. mapping said events to said set of rules for deriving a list of affected rules;

h. evaluating said list of affected rules to determine if they have been qualified, and if so; and, i. saving for further processing only those affected rules determined as qualified and belonging to said enabled instance of said RuleGroup Class.

* * * * *